(12) United States Patent
Ain et al.

(10) Patent No.: US 7,339,896 B2
(45) Date of Patent: *Mar. 4, 2008

(54) AVAILABLE BANDWIDTH DETECTOR FOR SAN SWITCH PORTS

(75) Inventors: Jonathan Wade Ain, Tucson, AZ (US); Robert George Emberty, Tucson, AZ (US); Craig Anthony Klein, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 874 days.

This patent is subject to a terminal disclaimer.

(21) Appl. No.: 10/238,751

(22) Filed: Sep. 10, 2002

(65) Prior Publication Data

US 2004/0047291 A1   Mar. 11, 2004

(51) Int. Cl.
  *H04L 12/26* (2006.01)
  *H04L 12/66* (2006.01)
  *H04L 12/56* (2006.01)
  *H04J 3/16* (2006.01)
  *G06F 15/173* (2006.01)
  *G06F 15/16* (2006.01)

(52) U.S. Cl. ............... 370/252; 370/463; 370/468; 370/395.41; 709/223; 709/229

(58) Field of Classification Search ........... 370/252, 370/253, 468, 232, 233, 234, 235, 238, 254, 370/395.21, 400, 395.4, 395.41, 463, 230.1; 709/223, 224, 225, 226, 229

See application file for complete search history.

(56) References Cited

U.S. PATENT DOCUMENTS

| | | | |
|---|---|---|---|
| 4,486,739 A | 12/1984 | Franaszek et al. | |
| 5,193,090 A | 3/1993 | Filipiak et al. | |
| 5,604,742 A | 2/1997 | Colmant et al. | |
| 5,771,228 A | 6/1998 | Seetharam et al. | |
| 5,878,029 A * | 3/1999 | Hasegawa et al. | 370/236 |
| 5,943,316 A | 8/1999 | Davis | |
| 6,016,307 A * | 1/2000 | Kaplan et al. | 370/238 |

(Continued)

FOREIGN PATENT DOCUMENTS

JP   10-276240   10/1998

OTHER PUBLICATIONS

Kuroyanagi, N., "A new approach for enhancing the throughput capability of a synchronous bus LAN", SBT/IEEE International Telecommunications Symposium, 1990. ITS '90 Symposium Record, 1990, pp. 243-249.

*Primary Examiner*—Chris Kelley
*Assistant Examiner*—Peter L Cheng

(57) ABSTRACT

A system and method for measuring data transmission activity through a port of a switch device interconnecting nodes of a storage area network, the port transmitting data as words of predetermined length, one data word indicating idle port activity. The method includes steps of: counting a number of transmitted words received from the port in a first counter device; and, for each word counted, comparing that word with a predetermined word indicating no (idle) port transmission activity. In response to the comparing, a number of matches are counted in a second counter device. In this manner, a ratio of a number of counted matches with a total amount of words counted indicates available bandwidth for transmitting additional data over that link. Preferably, this value is communicated to a processor device for controlling bandwidth over the link.

21 Claims, 3 Drawing Sheets

U.S. PATENT DOCUMENTS

| | | |
|---|---|---|
| 6,098,123 A | 8/2000 | Olnowich |
| 6,141,327 A | 10/2000 | Kalkunte et al. |
| 6,144,641 A * | 11/2000 | Kaplan et al. .............. 370/238 |
| 6,151,334 A | 11/2000 | Kim et al. |
| 6,233,236 B1 * | 5/2001 | Nelson et al. .............. 370/359 |
| 6,345,338 B1 | 2/2002 | Milillo et al. |
| 6,370,119 B1 * | 4/2002 | Basso et al. ................ 370/252 |
| 2003/0016630 A1 * | 1/2003 | Vega-Garcia et al. ....... 370/252 |
| 2004/0047294 A1 * | 3/2004 | Ain et al. ................... 370/238 |

* cited by examiner

AVAILABLE BANDWIDTH DETECTOR FOR SAN SWITCH PORTS

FIELD OF THE INVENTION

The resent invention relates to storage area networks (SANs) generally, and particularly, to a system and method for measuring performance of individual switches comprising an SAN switch fabric.

DESCRIPTION OF THE PRIOR ART

FIG. 1 depicts generally a Storage Area Network (SAN) 10 which is a dedicated high performance network capable of moving data between heterogeneous servers 16a, 16b, . . . ,16n and storage resources such as disk drives and arrays (RAIDS) 18 or tape storage devices and/or libraries 20. As shown in FIG. 1, a Local Area Network (LAN) 12 is provided which enables the sharing of data files among groups of user clients, such as desktop computers 14a, 14b, . . . ,14n. The LAN 12 may comprise an Internet Protocol (IP) network such as Ethernet and provides client/server connectivity between the desktop client 14a, and SAN server devices 16a, 16b, . . . ,16n using messaging communications protocols like TCP/IP. The SAN 10 includes a separate dedicated network, such as a Fiber Channel network 25, that preferably comprises a switched topology or "fabric" including fiber channel interconnect devices such as switches, 30, routers 22 and high speed serial links 26 interconnecting the servers 16a, 16b, . . . ,16n to the storage subsystems 18, 20 for storage networking. As known, such a SAN architecture 10 advantageously minimizes any traffic conflicts and provides for increased scalability, availability, and file transfers over longer distances as compared to SANs of traditional messaging networks comprising bus architectures. The Fiber Channel based SAN, such as shown in FIG. 1, combines the high performance of an I/O channel and the advantages of a network (connectivity and distance of a network) using similar network technology components like routers 22, switches 30 and gateways (not shown). Thus, SAN products do not function like a server. Rather, the SAN product processes block I/O protocols, such as Fiber Channel Protocol (SCSI-FCP) or Fiber Connection (FICON), for some other system, e.g., a server.

As known, the fiber channel switching fabric 25 is organized into logical entities including ports, nodes and platforms. For instance, fiber channel "nodes" are physical devices, e.g., disk drive or disk arrays, workstations, storage devices, etc., that may be a source or destination of information to/from other nodes. Each node comprises one or more "ports" which are the hardware interfaces that connect all fiber channel devices to the topology via links, i.e., electrical or optical transmit fibers, e.g. cables of copper or optical fiber. Ports are designated and have different attributes depending upon the switch topology in which they are implemented, e.g., point-to-point, arbitrated loop, fabric. Special switch fabric interconnect devices that are utilized for interfacing with other physical I/O interfaces over longer distances, e.g., ATM, SONET, etc., are referred to as expansion ports or "E_ports" which are special fabric-to-fabric ports for connecting fabric elements via links over longer geographic distances. According to Fiber Channel hardware standards, data transmission through the links is serial. Implementing a Gigabit Ethernet SAN, for example, links are available to transmit and receive data communications at 1000 Mbits/see. However, in most systems today, nodes operate at one or more data rates, e.g., quad speed of up to 400 Mbits/sec and greater. As the link may operate at the various data rates, it is necessary to encode clock information within the data stream. One encoding scheme used by fiber channel encodes eight (8) bit data bytes into ten (10) bit characters (known as 8B/10B encoding), such as is described in U.S. Pat. No. 4,486,739, the contents thereof being incorporated herein by reference.

As mentioned, a node's port is the entity connecting all fiber channel devices to the topology. The port thus provides hardware providing data transmit functionality, for instance, encoding data according to 8B/10B encoding for transmission in serialized form; and, receive functionality, for instance, de-serializing The received data stream and decoding the de-serialized data in accordance with 8B/10B decoding. FIG. 2 depicts the current state of The art of a serial link data stream 100 connecting switching nodes (not shown) via ports in a switch fabric. As shown in FIG. 2, data 110 is received in serial form (10 bit characters) from a node port via serial link 100. The received serial data enters the Serial-Deserializer (SERDES) module 102 which includes a deserializer circuit for de-serializing the data via a phase-lock loop buffer (PLL), identifying transmission character and word boundaries, and outputting 10-bit parallel words. This is because the transmission of information is encoded according to the 8b/10b encoding scheme prior to serialization, with each transmission character comprising 10 bits. As part of The receive process, The receiver synchronizes to The incoming data stream. Particularly, as The encoded data stream does not provide all of The necessary clock information, the PLL must synchronize to the transmit clock sending the serial data stream. To perform this, the PLL locks onto transitions of the received data stream and only when the phase locked loop circuitry has locked to the embedded clock, will the data be deserialized. Thus, as part of The synchronization process, the PLL additionally generates a receive clock synchronized to the words received. The deserialized data enters an 8b/10b decoder 104, where The data is then converted to 8-bit data in parallel with parity. The data Then enters an elastic FIFO buffer 106, where it is accessible via Direct Memory Access DMA engine 142 (not shown).

Currently, within a SAN Network, there is no method to measure the data transmit/receive activity (i.e., bandwidth) through the various ports of the switches in the switch fabric. It would be highly advantageous to be able to do this for purposes of load balancing and performance measurements.

According to the Fiber Channel protocol, words comprising an ordered set of four unique ten (10) bit encoded transmission characters have been defined to provide low level link control and signaling functions in addition to transmit and receive clocking information. One type of ordered set, referred to as primitive signals, have been configured to indicate events at a sending (transmitting) port. Such primitive signals include an ordered set providing clock synchronization information and, an ordered set providing IDLE information, which is a Fiber channel "word" transmitted on a link when a port is operational yet has no data or other information to send. These IDLE words are necessary to maintain synchronization with a receiver at the other end of the link.

Thus, it would be further highly desirable to provide a system and method for measuring the data transmit activity at a switch node port in the SAN switch fabric by incorporating a simple state machine that counts the number of IDLE words within a given number of received words.

SUMMARY OF THE INVENTION

It is an object of the present invention to measure the data transmit/receive activity (bandwidth) through the various ports of the switches in a Fiber Channel switch fabric.

It is a further object of the present invention to measure the activity through the various ports of the switches in the switch fabric by incorporating a simple state machine that counts the number of IDLE words within a given number of received words. In this manner, an amount of unused bandwidth through one direction of a switch port connection (e.g., duplex switch) may be quantitatively measured.

According to the principles of the invention, there is provided a system and method for measuring data transmission activity through a port of a switch device interconnecting nodes of a storage area network, the port transmitting data as words of predetermined length, one data word indicating idle port activity. The method includes steps of: counting a number of transmitted words received from the port in a first counter device; and, for each word counted, comparing that word with a predetermined word indicating no port transmission activity. In response to the comparing, a number of matches are counted in a second counter device. In this manner, a ratio of a number of counted matches with a total amount of words counted indicates available bandwidth for transmitting additional data over that link. Preferably, this value is communicated to a processor device for controlling bandwidth over the link. Further, each word is tapped off of a serial stream communicated over the link from the port in parallel form and received in a receive shift FIFO register in synchrony with a received clock.

In a fabric composed of multiple switches, each having the state machine of the invention, then each E_Port (switch-to-switch link) may be measured for available bandwidth at the received end.

It is understood that the system and method of the present invention may be implemented for switches in many types of SANs, including Gigabit Ethernet, INFINIBAND®, and iSCSI. Furthermore, the present invention may be implemented for determining available bandwidth for other types of Fiber Channel node ports. That is, other ports interconnected by links in a switch fabric may benefit from the system and method of the invention. For instance, the invention may be implemented for measuring available bandwidth at N_Ports, NL_Ports, F_ports, FL_ports, G_Ports, GL_Ports, etc. of a Fibre Channel network.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
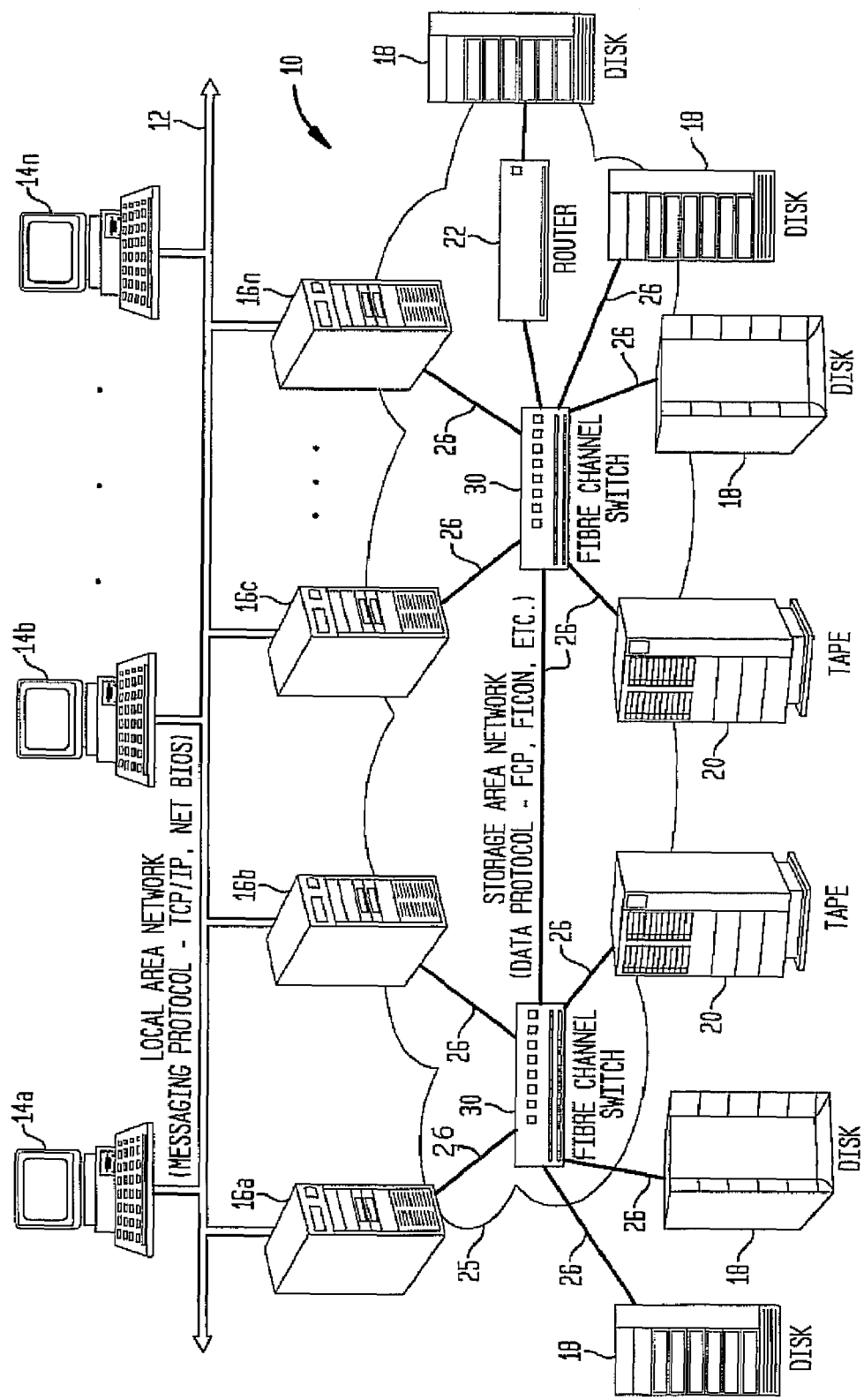
FIG. 1 depicts generally a Storage Area Network (SAN) 10 including a dedicated high performance network capable of moving data between heterogeneous servers and storage resources such as disk drives and arrays (RAIDS) or tape storage devices and/or libraries.
Figure 2:
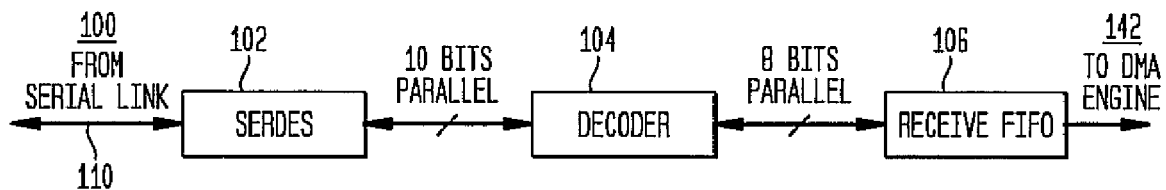
FIG. 2 depicts the current state of the art of a serial link data stream 100 connecting switching nodes (not shown) via ports in a switch fabric; and, FIG. 3 illustrates the state machine for measuring the activity through the various ports of the switches in a switch fabric of a Storage Area Network according to the present invention.
Figure 3:
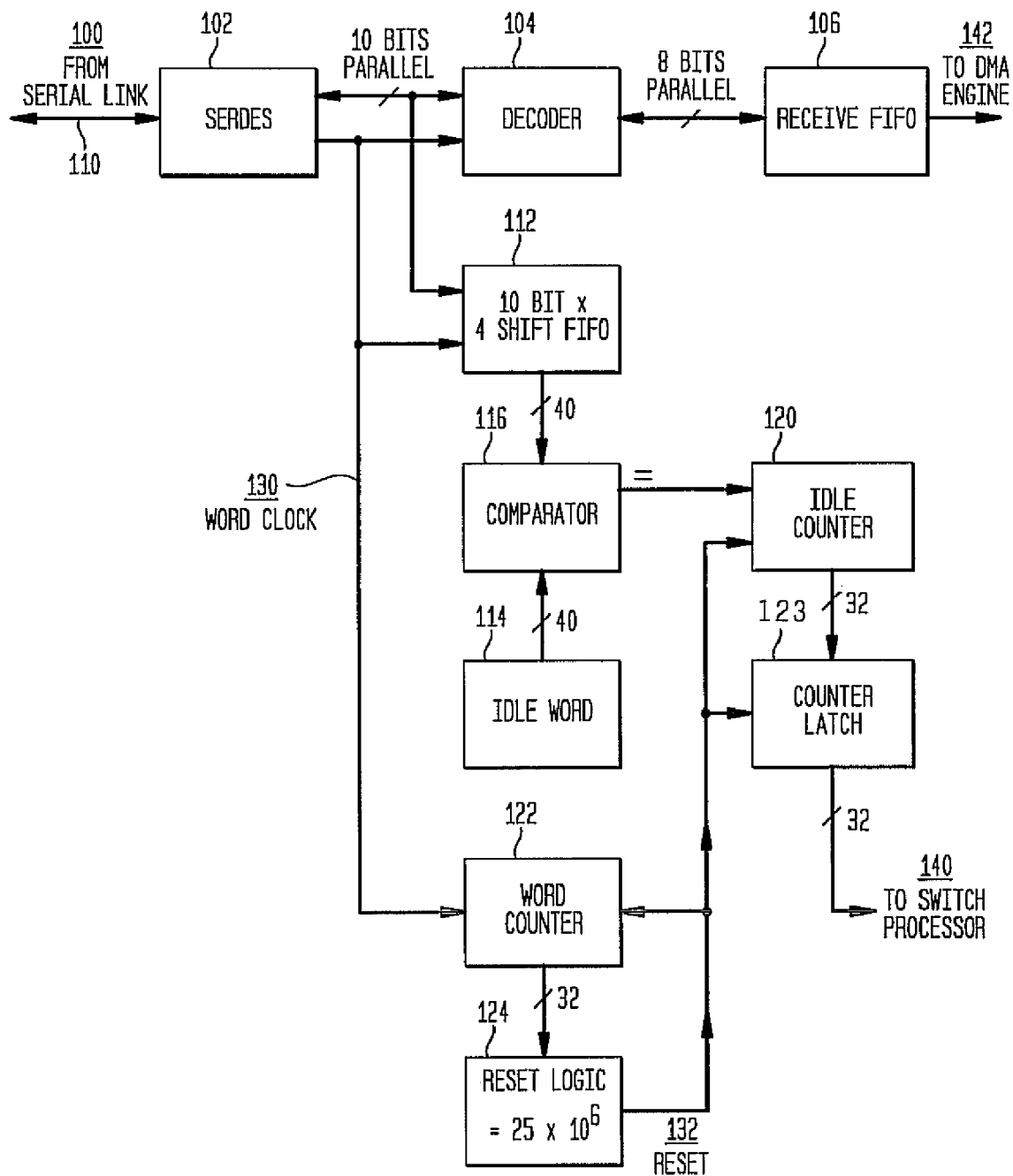

FIG. 3 illustrates the state machine for measuring the activity through the various ports of a switch device in the fiber channel Storage Area Network according to the present invention. As shown in FIG. 3, the data stream 110 communicated from a node is received at a switch port (not shown) along link 100. The data stream is received and processed by the SERDES module 102 which provides link control for a fiber channel port. The SERDES deserializer receives the serial stream and generates 10-bit wide data bytes (encoded characters), and a word clock 130, indicating a word is available.

The received 10-bit wide data byte is tapped off the output of the SERDES module 102 and clocked into a 10-bit wide ×4 deep shift FIFO register 112 with parallel access to accumulate a transmitted ordered set comprising 40 bits, i.e., four ten-bit words. The resulting 40-bit data word is compared with the IDLE ordered set, which is a special ordered set (40-bit word) specified by the Fiber Channel protocol to be transmitted when a port (of a node) has no valid data to send. Preferably, the special 40-bit IDLE word is hard-wired in a register 114 or equivalent data storage structure. When the FIFO register112 has received four characters in succession (i.e., the 40 bit word), a comparator device 116 is triggered compares the received ordered set to determine if the received ordered set corresponds to the IDLE ordered set (word). Each time an IDLE word is detected by comparator 116, a comparator output signal is generated to increment a counter device 120 for counting IDLE words. Simultaneously with the detection and counting of received IDLE words, a word counter device 122 is provided to count the total number of words received. Particularly, as shown in FIG. 3, the word clock 130 that clocks the received 10-bit wide data words into the shift FIFO register 112, is additionally implemented to count the total number of received words in the word counter device 122. Reset logic circuit 124 is provided to generate a reset signal 132 when the counter device 122 has counted a pre-determined number of words. The reset logic word count is configurable depending upon the type of network implemented, and for purposes of explanation, may be set to reach a value $25 \times 10^6$, for example. The value of $25 \times 10^6$ words, in the example system illustrated in FIG. 3, would correspond to a link 100 data rate of 1.0 Gbit/sec as there are 4 characters/word and 10 bits/character (according to the 8b/10b encoding scheme) which is multiplied by $25 \times 10^6$ words total number received and counted. Thus, when the amount of words received (and counted) has reached the value specified by the reset logic circuit 124 (e.g., $25 \times 10^6$), the reset signal 132 is generated to latch the value of the IDLE counter register 120 by a counter latch device 123. Additionally, at that moment, the reset signal 132 resets the IDLE counter 120 and word counter 122, so that continuous bandwidth activity at a switch port may be ascertained. Preferably, the latched IDLE counter value is communicated to a processor device e.g., provided in the switch, via a bus 140. In this manner, the system processor may thus compute a percentage comprising a ratio of the number of IDLE ordered sets (words) received for a fixed number of transmission words (e.g., $25 \times 10^6$), which translates into available bandwidth.

It should be understood that the state machine of the invention for counting IDLE words compared to a fixed number of received words transmitted by a switch device in a SAN or fiber channel network node, does not effect the throughput of the switch, as it does not change the critical path of the data stream 100.

It is understood that the system and method of the present invention may be implemented at switch nodes in many types of SANs, including Gigabit Ethernet, INFINI-BAND®, and iSCSI. Furthermore, the present invention may be implemented for determining available bandwidth for other types of Fiber Channel node ports. That is, other ports interconnected by links in a switch fabric may benefit from the system and method of the invention. For instance, the invention may be implemented for measuring available bandwidth at N_Ports, NL_Ports, F_ports, FL_ports, G_Ports, GL_Ports, etc. of a Fibre Channel network.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by letters patent is:

1. A system for measuring data transmission activity through a port of a switch device interconnecting nodes of a storage area network, the port transmitting data as words of predetermined length, one data word indicating idle port activity, said system comprising:
    first counter means for counting a fixed amount of transmitted words received from said port;
    means for comparing each received word of said fixed amount with a predetermined word indicating said idle port transmission activity; and,
    means for counting a number of matches in a second counter means,
    wherein a ratio of said number of counted matches with said fixed amount of words counted indicates available bandwidth for transmitting additional data through said port.

2. The system as claimed in claim 1, wherein said storage area network is a fiber channel network comprising switch devices interconnecting nodes by communication links, said links carrying data in serial form between switch devices in a switch fabric of said fiber channel network.

3. The system as claimed in claim 2, wherein said data words are communicated over said link in serial form and received as a serial stream, said system further comprising:
    a means for synchronizing receipt of said data words from said serial stream and generating a clock signal indicating receipt of a transmitted word in said serial stream; and,
    a means for de-serializing said data stream and converting each received word to a parallel format.

4. The system as claimed in claim 3, wherein one or more data words received includes a successive sequence of characters of predefined hit length.

5. The system as claimed in claim 4, wherein a received word comprises a sequence of characters in parallel format, said system further comprising a shift register for receiving said sequence of characters in parallel format and forming a word, each word being clocked into said register at a rate according to said generated clock signal.

6. The system as claimed in claim 3, wherein said first counter means receives said generated clock signal indicating receipt of a transmitted word in said serial stream, said counter means maintaining a current word count that is incremented upon receipt of each transmitted word.

7. The system as claimed in claim 6, wherein said first counter means for counting a number of transmitted words received generates a signal indicating said current count, said system further comprising:
    a logic circuit receiving said current word count signal and comparing a current count value with a pre-determined number indicating a data rate of said link; and,
    a counter latch circuit for latching a total number of matches accumulated in said second counter means when a current count value equals said pre-determined number, said latched total number of matches and said pre-determined number being used to calculate said ratio.

8. The system as claimed in claim 7, wherein said logic circuit generates a reset signal for resetting said first counter and second counter means when said current count value equals said pre-determined number indicating a link data rate.

9. The system as claimed in claim 1, further including means for communicating said total number of matches to a processor device for calculating said available bandwidth at said transmitting port.

10. The system as claimed in claim 1, further comprising means for storing said predetermined word indicating said idle port transmission activity.

11. A method for measuring data transmission activity through a port of a switch device interconnecting nodes of a storage area network, the port transmitting data as words of predetermined length, one data word indicating idle port activity, said method comprising:
    a) counting a number of transmitted words received from said port in a first counter device; and,
    b) for each word counted, comparing that word wit a predetermined word indicating idle port transmission activity; and
    c) counting a number of matches in a second counter device in response to said comparing, wherein said ratio of a number of counted matches with said fixed amount a total amount of words counted indicates available bandwidth for transmitting additional data through said port.

12. The method as claimed in claim 11, wherein said network is a fiber channel network comprising switch devices interconnecting nodes by communication links, said links carrying data in serial form between switch devices in a switch fabric of said fiber channel network.

13. The method as claimed in claim 11, wherein said data words are communicated over said link in serial form and received as a serial stream, said reception of said serial stream further comprising:
    generating a clock signal indicating receipt of a transmitted word in said serial stream; and,
    de-serializing said data stream and converting each received word to a parallel format.

14. The method as claimed in claim 13, wherein one or more data words received includes a successive sequence of characters of predefined bit length.

15. The method as claimed in claim 14, wherein a received word comprises a sequence of characters in parallel format, said method further comprising:
    providing a shift register for receiving said sequence of characters in parallel format and forming a word thereof, each word of said sequence being clocked into said register at a rate according to said generated clock signal.

16. The method as claimed in claim 11, wherein said step of counting a number of transmitted words by a first counting device includes generating a signal indicating a current word count, said method further comprising:

implementing logic for receiving said current word count signal and comparing a current count value with a pre-determined number indicating a data rate of said link; and, latching a total number of matches accumulated in said second counter means when a current count value equals said pre-determined number, said latched total number of matches and said pre-determined number being used to calculate said ratio.

17. The method as claimed in claim 16, wherein said implementing logic step includes generating a reset signal for resetting said first counter and second counter devices when said current count value equals said pre-determined number indicating said link data rate.

18. The method as claimed in claim 11, further comprising a step of:

communicating said total number of matches to a processor device for calculating said available bandwidth at said transmitting port.

19. The method as claimed in claim 11, further comprising a step of:

storing said predetermined word indicating said idle port transmission activity.

20. A system for determining available bandwidth of a port provided in a switch device interconnecting nodes of a fiber channel Storage Area Network (SAN), the port transmitting data words of predetermined length in serial form through a link connecting to a receive node of the SAN, one data word indicating a data transmission event at said port, said system comprising:

means at said receive node for synchronizing receipt of said data words from said serial stream and generating a clocking signal accordingly;

first counter means receiving said clocking signal for counting a fixed amount of transmitted words received from said port;

means for comparing each received word with a predetermined word indicating said data transmission event and counting a number of matches in a second counter means;

wherein a ratio of said number of counted matches with a fixed amount of words counted indicates available bandwidth for transmitting additional data through said transmitting port.

21. A method for determining available bandwidth of a port provided in a switch device interconnecting nodes of a fiber channel Storage Area Network (SAN), the port transmitting data words in serial form through a link connecting to a receive node of the SAN, a data word indicating a data transmission event at said transmitting port, said method comprising:

synchronizing receipt of said data words from said serial stream at the receive node and generating a clocking signal accordingly;

utilizing said clocking signal to count fixed amounts of transmitted words received from said port;

comparing each said received word with a predetermined word indicating said data transmission event; and, counting a number of matches of each received word with said predetermined word, wherein a ratio of said number of counted matches with said fixed amount of transmitted words counted indicates available bandwidth for transmitting additional data through said port.

* * * * *